United States Patent
Marshall et al.

(10) Patent No.: US 7,134,212 B2
(45) Date of Patent: Nov. 14, 2006

(54) LASER LEVEL

(75) Inventors: James D. Marshall, Mallorytown (CA); Oleksiy P. Sergyeyenko, Brockville (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/384,808

(22) Filed: Mar. 20, 2006

(65) Prior Publication Data

US 2006/0159153 A1 Jul. 20, 2006

Related U.S. Application Data

(63) Continuation of application No. 10/643,382, filed on Aug. 19, 2003, now Pat. No. 7,031,367, which is a continuation-in-part of application No. 10/277,474, filed on Oct. 22, 2002, now Pat. No. 6,914,930.

(51) Int. Cl.
*G01C 15/00* (2006.01)

(52) U.S. Cl. .............. 33/286; 33/281; 33/291; 33/DIG. 21; 372/109

(58) Field of Classification Search .......... 33/281–283, 33/285–286, 290–292, DIG. 21, 347, 227
See application file for complete search history.

(56) References Cited

U.S. PATENT DOCUMENTS

| | | | | |
|---|---|---|---|---|
| 5,063,679 A | * | 11/1991 | Schwandt | 33/347 |
| 5,075,977 A | * | 12/1991 | Rando | 33/227 |
| 5,148,108 A | * | 9/1992 | Dufour | 33/365 |
| 5,195,248 A | * | 3/1993 | Juhasz | 33/393 |
| 5,218,770 A | * | 6/1993 | Toga | 33/276 |
| 5,459,932 A | | 10/1995 | Rando et al. | |
| 5,539,990 A | * | 7/1996 | Le | 33/283 |
| 5,594,993 A | * | 1/1997 | Tager et al. | 33/227 |
| 5,754,582 A | | 5/1998 | Dong | |
| 5,842,282 A | | 12/1998 | Ting | |
| 5,864,956 A | | 2/1999 | Dong | |
| 5,872,657 A | * | 2/1999 | Rando | 33/290 |
| 6,202,312 B1 | | 3/2001 | Rando | |
| 6,351,890 B1 | | 3/2002 | Williams | |
| 6,502,319 B1 | | 1/2003 | Goodrich et al. | |
| 6,588,115 B1 | | 7/2003 | Dong | |
| 6,871,408 B1 | | 3/2005 | Malard et al. | |
| 6,935,034 B1 | | 8/2005 | Malard et al. | |
| 2003/0231303 A1 | | 12/2003 | Raskin et al. | |

FOREIGN PATENT DOCUMENTS

DE  203 04 114 U1  5/2003

* cited by examiner

*Primary Examiner*—Yaritza Guadalupe-McCall
(74) *Attorney, Agent, or Firm*—Wesley W. Muller; John Yun; Bruce S. Shapiro

(57) ABSTRACT

A laser level disposable on a reference surface includes a housing, a pendulum pivotably connected to the housing, a first laser diode disposed on the pendulum for emitting a first laser beam along a first path, a first lens disposed on the pendulum in the first path for converting the first laser beam into a first planar beam, the first planar beam forming a first line on the reference surface, a second laser diode disposed on the pendulum for emitting a second laser beam along a second path, and a second lens disposed on the pendulum in the second path for converting the second laser beam into a second planar beam, the second planar beam forming a second line on the reference surface, wherein the first and second lines are substantially perpendicular and non-intersecting.

14 Claims, 4 Drawing Sheets

LASER LEVEL

CROSS-REFERENCE TO RELATED APPLICATIONS

This application is a continuation of U.S. application Ser. No. 10/643,382 filed on Aug. 19, 2003 now U.S. Pat. No. 7,031,367, which was a continuation-in-part of U.S. application Ser. No. 10/277,474, filed Oct. 22, 2002, now U.S. Pat. No. 6,914,930.

FIELD OF THE INVENTION

This invention relates generally to laser instruments and specifically to laser levels.

BACKGROUND OF THE INVENTION

Laser levels have been used in construction for many years. They typically seek to produce a plane of light for a reference for construction projects. Laser levels have been used for large scale construction projects like commercial excavating, laying foundations, and installing drop ceilings. Laser levels save considerable time during initial layout of a construction job compared to other tools such as beam levels, chalk lines, or torpedo levels. Some examples of jobs where laser levels would be useful include laying tile, mounting cabinets, installing counter tops, and building outdoor decks.

It is an object of the present invention to provide a laser level that is inexpensive and usable by the general public.

SUMMARY OF THE INVENTION

In accordance with the present invention, an improved laser level is employed. The laser level disposable on a reference surface includes a housing, a pendulum pivotably connected to the housing, a first laser diode disposed on the pendulum for emitting a first laser beam along a first path, a first lens disposed on the pendulum in the first path for converting the first laser beam into a first planar beam, the first planar beam forming a first line on the reference surface, a second laser diode disposed on the pendulum for emitting a second laser beam along a second path, and a second lens disposed on the pendulum in the second path for converting the second laser beam into a second planar beam, the second planar beam forming a second line on the reference surface, wherein the first and second lines are substantially perpendicular and non-intersecting.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
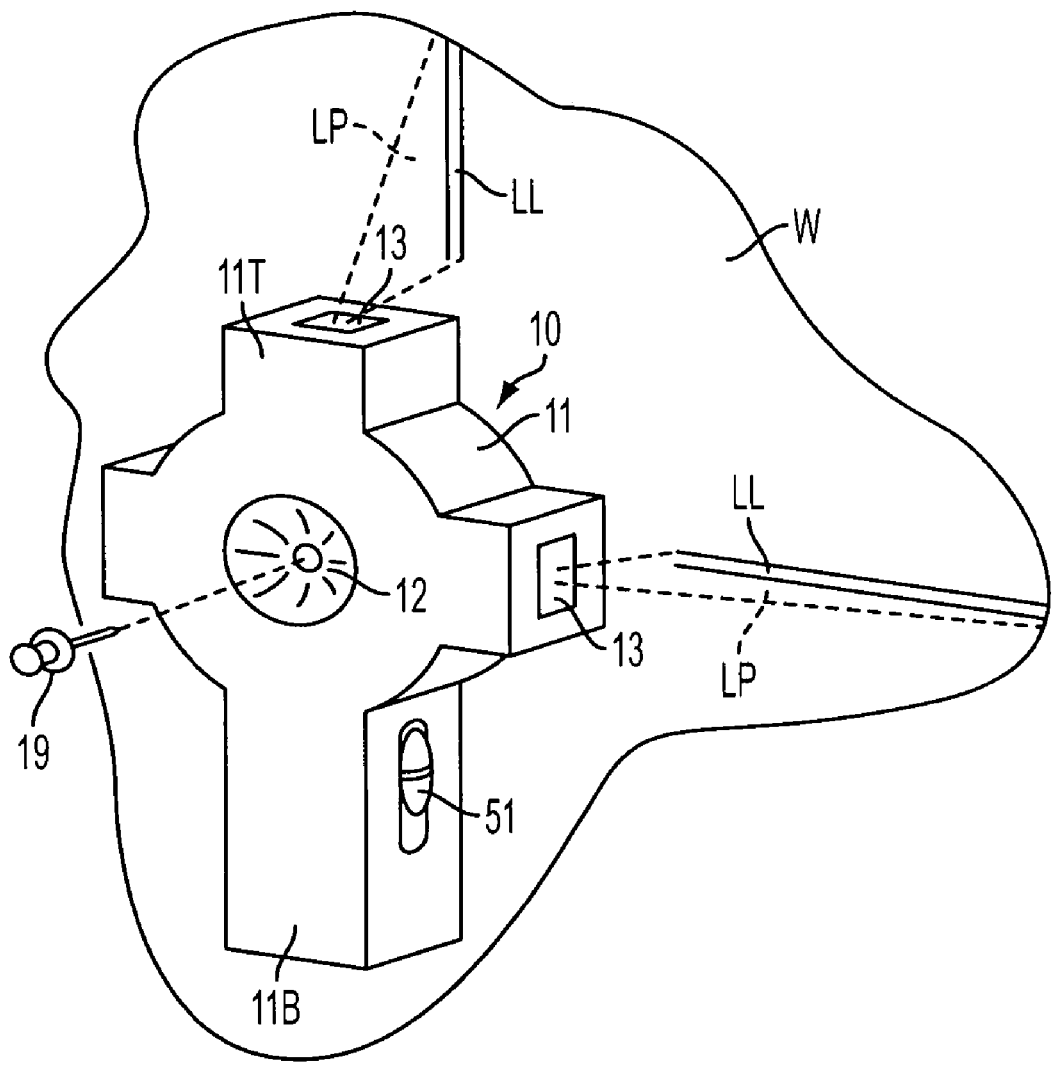
FIG. 1 is a perspective view of a first embodiment of a laser level according to the invention.
Figure 2:
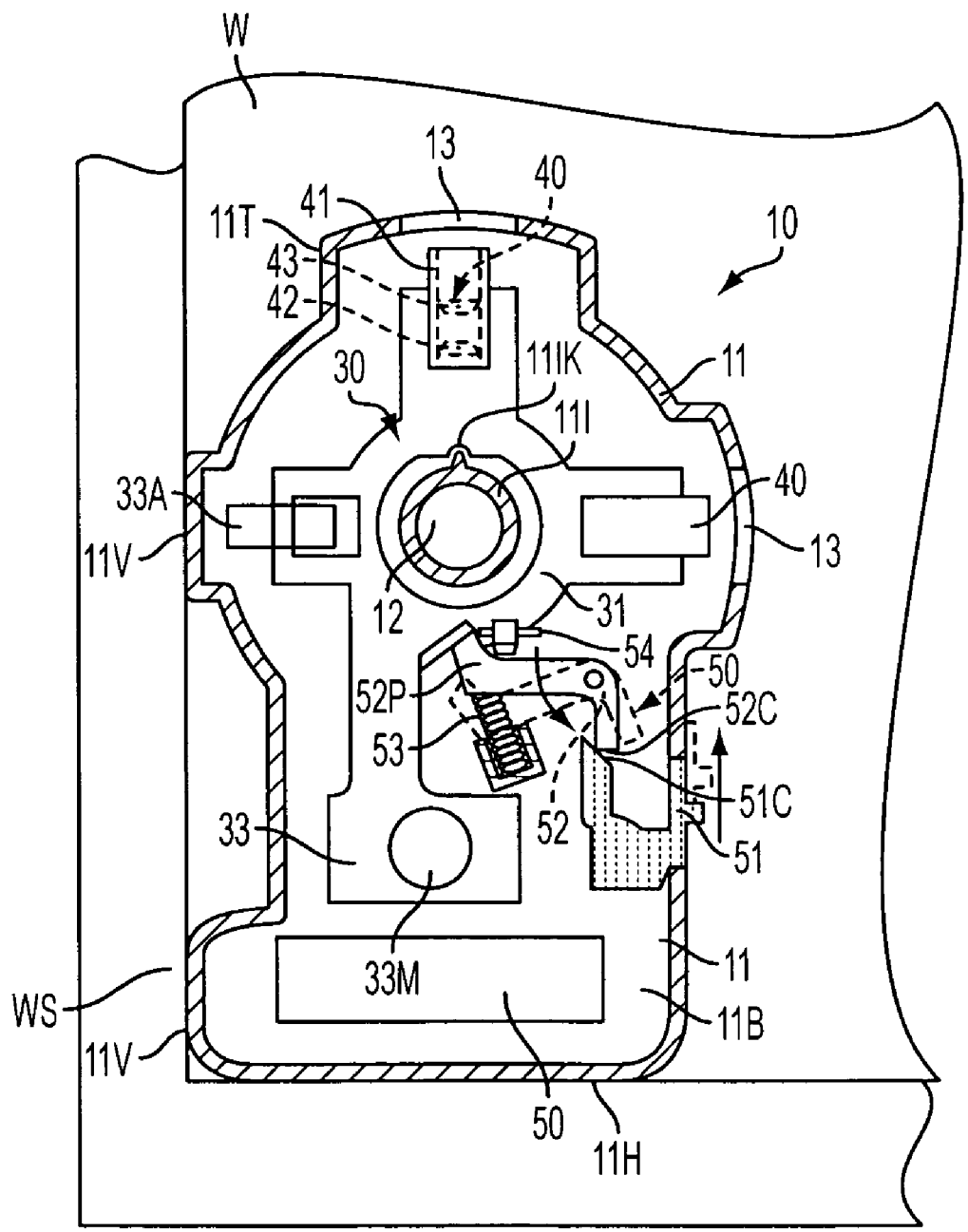
FIG. 2 is a cross-sectional view of a second embodiment of the laser level according to the invention.

The invention is now described with reference to the accompanying figures, wherein like numerals designate like parts. FIGS. 1–2 show to two different embodiments of the invention. Persons skilled in the art will recognize that both embodiments have similar features, and that the main difference is the shape of the housing, which may provide advantages further discussed below.

Referring to FIGS. 1–2, a laser level 10 may have a housing 11. The housing 11 may have a top portion 11T and a bottom portion 11B. The housing may also have a hole 12 extending through the housing 11. The hole 12 preferably extends through the top portion 11T. The perimeter of the hole 12 may be defined by an inner wall 11I.

The top portion 11T may carry a pendulum assembly 30. Preferably, the pendulum assembly 30 has a main body 31, which may be made of metal or plastic. Main body 31 may be disposed on a knife edge 11IK. Knife edge 11IK may be connected to and/or supported by inner wall 11I. Alternatively, knife edge 11IK may be connected to and/or supported by housing 11. Persons skilled in the art will recognize that pendulum assembly 30 may be supported by means other than knife edge 11IK, such as a pin, bearing, point or other pendulous means.

The main body 31 may carry at least one laser assembly 40 and preferably two laser assemblies 40 disposed above and right of the knife edge 11IK. Persons skilled in the art will recognize that a laser assembly 40 may also be disposed left of knife edge 11IK. Persons skilled in the art will also recognize that the laser assemblies 40 will emit laser beams. Accordingly, it is preferable to provide housing 11 with windows 13 to allow the laser beams to exit from housing 11.

Preferably, the laser assemblies 40 are disposed on main body 31 to provide a self-leveling pendulum assembly that will emit substantially horizontal and substantially vertical laser beams when laser level 10 is disposed against a wall. It is preferable to align the laser assemblies 40 so that the center of hole 12 indicates the intersection of the laser beams.

Persons skilled in the art are directed to U.S. patent application Ser. No. 10/277,474, filed Oct. 22, 2002, which is fully incorporated herein by reference, for further information on how the elements within laser level 10 function, how they are calibrated, etc.

Referring to FIGS. 1–2, main body 31 may also have weights 33 to provide a lower center of gravity, and enhance the performance of the pendulum assembly 30. In addition, main body 31 may have at least one adjustment screw 33A to adjust the center of gravity of pendulum assembly 30, as necessary.

Main body 31 may also have a plaque 33M, made of magnetic material, ferrous material or non-ferrous conductive material, such as zinc or copper. Plaque 33M preferably is aligned with at least one magnet (and preferably two magnets) disposed in housing 11, e.g., on the inside of the front and rear walls of housing 11, for providing a damping action on pendulum assembly 30. Basically, eddie currents are generated within plaque 33M, as the plaque moves and interacts with the magnetic field supplied by the magnet(s).

Persons skilled in the art shall recognize that pendulum assembly 30 is preferably wholly contained within housing 11. However, the pendulum assembly 30 may be at least partly, if not completely, disposed outside of housing 11.

Persons skilled in the art shall recognize that a damping mechanism for damping the motion of pendulum assembly 30 may be provided. Persons skilled in the art are directed to the damping mechanism disclosed in U.S. Pat. No. 5,144,487, which is wholly incorporated by reference herein, as well as to its equivalents.

The bottom portion 11B of housing 11 may carry a battery 50 for powering the laser assemblies 40.

Referring to FIG. 23, laser assemblies 40 are disposed on main body 31. Laser assembly 40 may include a substantially cylindrical barrel 41, which may be adjustably connected to main body 31, laser diode 42 disposed in barrel 41, and a line lens 43 disposed in barrel 41. Persons skilled in the art will recognize that in the preferred embodiment, adjusting barrel 41 will result in moving laser diode 42 and line lens 43. Preferably, line lens 43 converts the laser beam exiting laser diode 42 into a planar beam. In addition, persons skilled in the art will recognize that a collimating lens may be disposed between laser diode 42 and line lens 43.

Referring to FIG. 1, with such arrangement, when laser level 10 is disposed against a wall W, laser assembly 40 will preferably emit a laser plane LP that contacts the wall W, forming a laser line LL on the wall. Persons skilled in the art will recognize that it is preferable to orient the laser assemblies 40 in such manner so that at least a portion of the laser plane LP will contact the wall W. In addition, persons skilled in the art will recognize that providing laser assemblies 40 on the pendulum assembly 30 discussed above will preferably result in laser level 10 projecting substantially horizontal and substantially vertical laser lines against the wall.

Referring to FIG. 2, laser level 10 may be provided with a locking assembly 50 to lock pendulum assembly 31 consistently in one position. Preferably, locking assembly 50 is combined with the switch actuator 51 which turns the laser assemblies 40 on and off. However, persons skilled in the art will recognize that locking assembly 50 may be separate from the switch or switch actuator 51.

Switch actuator 51 may have an inclined or cam surface 51C. Cam surface 51C may contacts a lock 52, and preferably contacts an inclined or cam surface 52C of lock 52.

Lock 52 is preferably pivotably attached to housing 11. Lock 52 has a conical locking portion 52P that can contact main body 31. Preferably, main body 31 has a corresponding portion for contacting locking portion 52P so that, when the two portions contact, the main body 31 cannot pivot. It is desirable to design the portions so that main body 31 is consistently and accurately locked in the same position every time locking portion 52P contacts main body 31. Main body 31 may carry an adjustment screw 54 for ensuring such consistent contact and locking action.

With such arrangement, lock 52 can be pivoted between a locking position where locking portion 52P contacts main body 31, and a bypassed position where locking portion 52P does not contact main body 31. Preferably, a spring 53 biases lock 52 towards the locking position.

A user can turn on the laser level 10 by moving switch actuator 51 upwardly.

If the user continues to move switch actuator 51 upwardly, cam surface 51C will cause lock 52 to pivot in a counter-clockwise direction towards the bypassed position, thus unlocking pendulum assembly 30. When the user wants to turn off the laser level 10 and/or lock the pendulum assembly 30, the user need only to move the switch actuator 51 downwardly, as the spring 53 will move lock 52 towards the locking position.

Users may want to lock the pendulum assembly 30 (while laser assemblies 40 are still on) for several reasons. First, housing 11 may have at least one vertical reference surface 11V, which is substantially parallel to the laser beam emitted by laser assembly 40 disposed above knife edge 11IK and/or substantially perpendicular to the laser beam emitted by laser assembly 40 disposed right of knife edge 11IK. Similarly, housing 11 may have at least one horizontal reference surface 11H, which is substantially perpendicular to the laser beam emitted by laser assembly 40 disposed above knife edge 11IK and/or substantially parallel to the laser beam emitted by laser assembly 40 disposed right of knife edge 11IK.

Accordingly, if the pendulum assembly 30 is locked and the laser level 11 is placed against a wall WS, the laser level 10 will emit laser beams that are substantially parallel and perpendicular to the wall WS.

Figure 5:
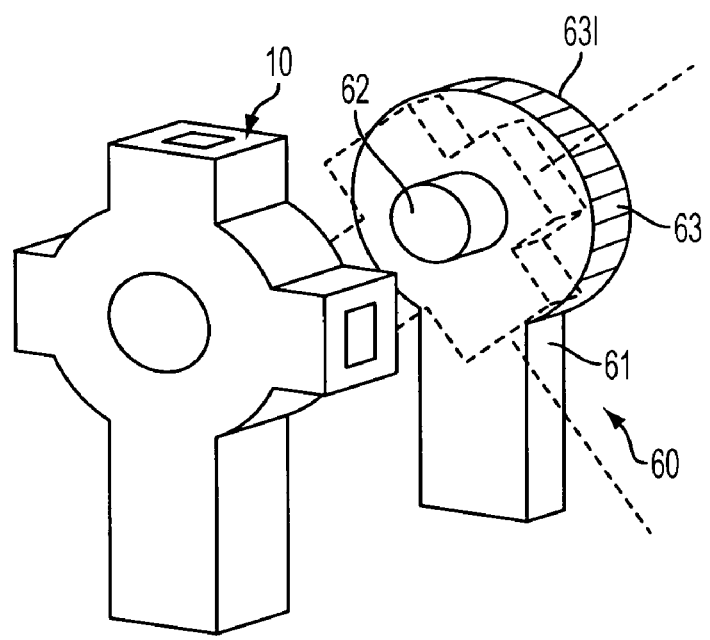
FIG. 5 illustrates an angle measuring device for use with the laser level.

Users may also want to use laser level 10 to measure angles. Referring to FIG. 5, the laser level 10 may be disposed on an angle measuring assembly 60. Angle measuring assembly 60 may have a body 61, a post 62 on body 61 and a scale edge 63 on body 61. Scale edge 63 may have angle indicia 63I thereon.

To measure an angle, the laser level 10 may be rotatably disposed on post 62.

The user would move the laser level 10 and angle measuring assembly 60 to the starting position. Preferably, the upward laser line will shine unto the scale edge. The user can then ensure that the laser line is at zero degrees. Then the user would rotate the laser level 10 (not the angle measuring assembly 60) to the desired end position. By reading the position of the laser line on the scale edge 63, the user will know the angle between the starting and end positions.

It is preferable to provide laser level 10 with a means for hanging the laser level 10 on the wall. As shown in FIG. 1, laser level 10 may be hung by inserting a pin 19 through hole 12.

Figure 3:
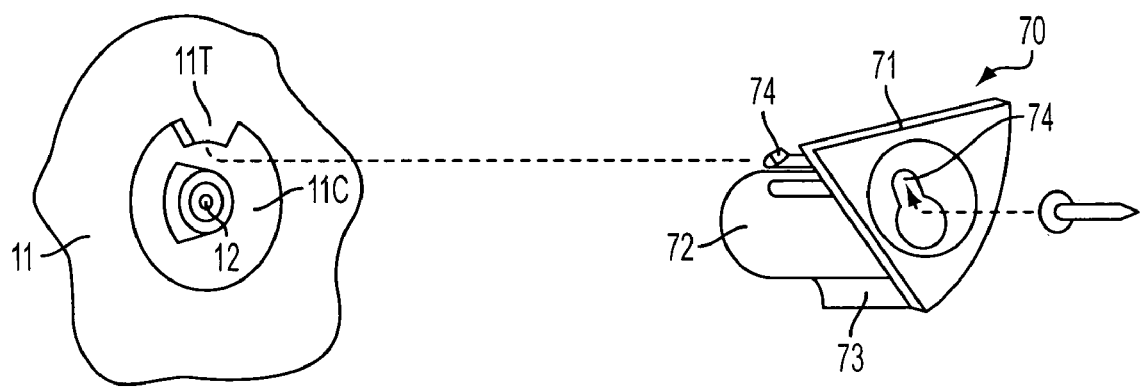
FIG. 3 illustrates a first wall hanging assembly for the laser level.

Alternatively, a hanger assembly 70 may be used for hanging laser level 10, as shown in FIG. 3. Hanger assembly 70 may have a main body 71 with a central hole 74 for receiving the head of a screw or nail hammered into a wall. Main body 71 may be made of a translucent material to facilitate location of a mark or nail.

Hanger assembly 70 may also have a post 72 extending rearwardly from main body 71. Ribs 73 may be disposed between the main body 71 and post 72 to increase structural strength, etc. Post 72 may have a snap hook 74 thereon. Hook 74 may be made of a resilient or elastic material, so that, when it is moved, it returns to its original position.

To install the laser level 10 unto hanger assembly 70, the user would need to dispose laser level 10 on post 72. Preferably, laser level 10 has a cavity 11C for receiving such post 72. Laser level 10 may also have a tab 11T to engage hook 74, and thus retain hanger assembly 70. In order to remove hanger assembly 70 from laser level 10, the user need only press hook 74 downwardly to clear tab 11T, allowing the user to pull out hanger assembly 70.

Figure 4:
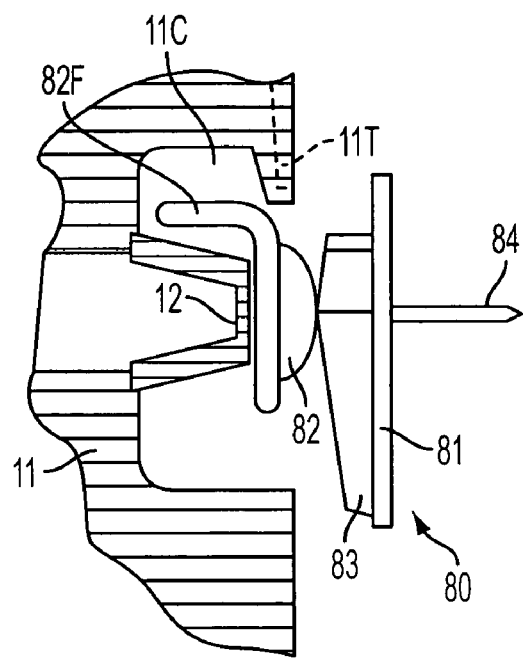
FIG. 4 is a partial cross-section of the laser level with a second wall hanging assembly.

An alternate hanger assembly 80 is shown in FIG. 4. Hanger assembly 80 may have a main body 81 with a pin 84 extending therefrom. Main body 81 may be made of a translucent material to facilitate location of a mark or nail. Hanger assembly 80 may also have a post 82 extending rearwardly from main body 81. Ribs 83 may be disposed between the main body 81 and post 82 to increase structural strength, etc.

Preferably, post 82 will have a rearwardly-extending flange 82F so that, when hanger assembly 80 is placed on the floor on flange 82F, pin 84 will not extend substantially vertically.

With such construction, the user would press pin 84 unto the wall. Preferably, laser level 10 has a cavity 11C for receiving post 82. The user may then align cavity 11C with post 82, and move laser level 10 towards the wall, until ribs 83 stop further movement. When the user lets go of the laser level 10, the laser level 10 may move downwardly slightly down under the force of gravity. Tab 11T may contact post 82 and stop restrain further downward movement.

To disengage the laser level 10, the user should raise it so that tab 11T can bypass post 82, allowing the user to pull out hanger assembly 80.

Persons skilled in the art may recognize other additions or alternatives to the means disclosed herein. However, all these additions and/or alterations are considered to be equivalents of the present invention.

What is claimed is:

1. A laser level disposable on a reference surface comprising:
    a housing;
    a first laser diode disposed in said housing for emitting a first laser beam along a first path;
    a first lens disposed in the first path for converting the first laser beam into a first planar beam, the first planar beam forming a first line on the reference surface;
    a cavity on a rear surface of said housing; and
    a hanger assembly comprising a main body and a post extending from said main body in a first direction;
    wherein said cavity is configured in dimension to receive said post.

2. The laser level of claim 1, wherein said post further comprises a flange extending at an angle with respect to said first direction.

3. The laser level of claim 2, wherein said housing further comprises a tab extending into said cavity, said tab configured to engage said flange.

4. The laser level of claim 1, wherein said hanging assembly further comprises a pin extending from said main body in a second direction.

5. The laser level of claim 4, wherein said pin is selectively removable from said main body.

6. The laser level of claim 4, wherein said pin is integrally formed with said main body.

7. The laser level of claim 1, further comprising:
    a pendulum pivotably connected to the housing, wherein said first laser diode is disposed on said pendulum.

8. The laser level of claim 1, further comprising:
    a second laser diode disposed on the pendulum for emitting a second laser beam along a second path; and
    a second lens disposed on the pendulum in the second path for converting the second laser beam into a second planar beam, the second planar beam forming a second line on the first reference surface.

9. The laser level of claim 8, further comprising a pendulum pivotably connected to the housing, wherein said first and second laser diodes are disposed on said pendulum.

10. The laser level of claim 8, wherein said first line and said second line are substantially parallel.

11. The laser level of claim 8, wherein said first line and said second line are substantially perpendicular.

12. A method of disposing a laser level on a substantially vertical reference surface comprising the steps of:
    attaching a hanger assembly to said reference surface, wherein said hanger assembly comprises a main body and a post extending from said main body in a first direction; and
    connecting said laser level to said hanging assembly, wherein said laser level comprises a housing, a first laser diode disposed in said housing for emitting a first laser beam along a first path, a first lens disposed in the first path for converting the first laser beam into a first planar beam, the first planar beam forming a first line on the reference surface, and a cavity configured in dimension to receive said post.

13. The method of claim 12, wherein the step of attaching said hanger assembly further comprises the step of inserting a pin of said hanger assembly into said vertical surface.

14. A laser level device disposable on a substantially vertical reference surface comprising:
    a body having a scale thereon;
    a housing rotatably disposed on the body;
    a first laser diode disposed within the housing for emitting a first laser beam along a first path;
    a first lens disposed within the housing in the first path for converting the first laser beam into a first planar beam, the first planar beam forming a first line on said first reference surface and the scale; and
    a mounting means associated with at least one of said housing and said body configured to removably mount said device to said substantially vertical surface.

* * * * *